(12) United States Patent
Kulas

(10) Patent No.: US 9,124,685 B2
(45) Date of Patent: *Sep. 1, 2015

(54) PORTABLE DEVICE INCLUDING CONTROL ACTIONS DEPENDENT ON A USER LOOKING AT A TOUCHSCREEN

(71) Applicant: Charles J. Kulas, San Francisco, CA (US)

(72) Inventor: Charles J. Kulas, San Francisco, CA (US)

(*) Notice: Subject to any disclaimer, the term of this patent is extended or adjusted under 35 U.S.C. 154(b) by 143 days.

This patent is subject to a terminal disclaimer.

(21) Appl. No.: 13/691,364

(22) Filed: Nov. 30, 2012

(65) Prior Publication Data

US 2013/0190044 A1    Jul. 25, 2013

Related U.S. Application Data

(60) Provisional application No. 61/590,284, filed on Jan. 24, 2012.

(51) Int. Cl.
| | |
|---|---|
| *H04M 1/00* | (2006.01) |
| *H04M 1/247* | (2006.01) |
| *G06F 3/041* | (2006.01) |
| *H04M 1/02* | (2006.01) |
| *G06F 3/042* | (2006.01) |
| *G06F 3/048* | (2013.01) |
| *H04M 1/725* | (2006.01) |
| *G06F 3/0484* | (2013.01) |
| *G06F 3/0488* | (2013.01) |

(52) U.S. Cl.
CPC .............. *H04M 1/2477* (2013.01); *G06F 3/041* (2013.01); *G06F 3/048* (2013.01); *G06F 3/0425* (2013.01); *G06F 3/0484* (2013.01); *G06F 3/0488* (2013.01); *H04M 1/00* (2013.01); *H04M 1/0202* (2013.01); *H04M 1/247* (2013.01); *H04M 1/72569* (2013.01); *H04M 2250/22* (2013.01); *H04M 2250/52* (2013.01)

(58) Field of Classification Search
CPC ....................................................... G06F 3/013
USPC ............................................... 455/556.1, 566
See application file for complete search history.

(56) References Cited

U.S. PATENT DOCUMENTS

2010/0253766 A1* 10/2010 Mann et al. ...................... 348/51
2011/0304695 A1* 12/2011 Lim et al. ......................... 348/46

* cited by examiner

*Primary Examiner* — Tuan H Nguyen

(57) ABSTRACT

In one embodiment, a phone detects the eyes of a user to determine if the user is looking at the phone prior to the phone initiating one or more predetermined actions. This is useful, for example, to prevent unwanted activation of a control on the phone as when a user inadvertently touches a control on the phone while taking the phone out of a pocket. Another embodiment prevents the phone from taking actions that may change the display, such as dimming, hibernating, sleeping, turning off, etc., if it is determined that the user is looking at the display screen.

15 Claims, 4 Drawing Sheets

PORTABLE DEVICE INCLUDING CONTROL ACTIONS DEPENDENT ON A USER LOOKING AT A TOUCHSCREEN

CROSS REFERENCES TO RELATED APPLICATIONS

This application claims priority from U.S. Provisional Patent Application Ser. No. 61/590,284; entitled "USER INTERFACE USING DEVICE AWARENESS", filed on Jan. 24, 2012, which is hereby incorporated by reference as if set forth in full in this document for all purposes.

BACKGROUND

Many conventional computing devices such as computers, tablets, game consoles, televisions, monitors, phones, etc., include a touchscreen. A touchscreen enables a user to interact directly with displayed objects on the touchscreen by touching the objects with a hand, finger, stylus, or other item. Such displayed objects may include controls that control functions on a phone. Using the touchscreen, the user can activate controls by touching corresponding objects on the touchscreen. For example, the user can touch an object such as a button on the touchscreen to activate a voice recognition application on the phone. The user can touch the touchscreen and swipe up and down to scroll a page up and down on the touchscreen.

The touchscreen display is typically controlled by a processor to dim or darken the screen after a brief period of time since the last touch in order to save power. For example, 10 seconds after the user has last touched the screen the screen may be dimmed or darkened completely. The display/touchscreen and other functionality of the phone can be turned off or put into a "hibernate" or "sleep" mode that uses less power. If the phone goes into a sleep mode, the user can "awaken" or fully activate the phone again by, for example, touching a button on the touchscreen or elsewhere on the device, and swipe the button or performing a different action to reactivate the phone from sleep mode.

The various displayed objects on the touchscreen may be changed frequently as different application controls, operating system features, or other functions are provided to a user. So, for example, a set of controls may be displayed until the user selects a control. Then a new set of controls or a new page of information may be displayed so that the originally-displayed set of controls is no longer visible.

SUMMARY

Embodiments generally relate to determining whether a user is looking at a phone's touch screen and using the determination to modify the phone's operation. In one embodiment, a phone detects the eyes of a user to determine if the user is looking at the phone prior to the phone initiating one or more predetermined actions. This is useful, for example, to prevent unwanted activation of a control on the phone as when a user inadvertently touches a control on the phone while taking the phone out of a pocket. The method also includes halting an initiation of an action if the phone determines that a user's eyes are looking at the phone, such as preventing the phone's screen from dimming or shutting off when a user is looking at the screen. In another embodiment, a method includes detecting eyes of a user, and detecting position or movement of the eyes relative to a display screen of a phone. This can be used, for example, to scroll a page on the display screen based on the movement of the user's eyes.

One embodiment provides A method comprising: detecting eyes of a user by using a camera on a phone; checking for position of the eyes relative to a display screen of the phone prior to the phone initiating one or more predetermined actions; and halting an initiation of the one or more predetermined actions if position of the eyes is detected.

Another embodiment provides an apparatus comprising: one or more processors; and logic encoded in one or more tangible media for execution by the one or more processors, and when executed operable to: detect eyes of a user; check for a position of the eyes relative to a display screen of a phone prior to the phone initiating one or more predetermined actions; and halt an initiation of the one or more predetermined actions if the position of the eyes is detected.

DETAILED DESCRIPTION

Embodiments described herein enhance phone functionality based on detection of eyes of a user. In one embodiment, a phone detects the eyes of a user and detects where the user is looking (the "sight line") of the eyes prior to the phone initiating certain actions, such as activating a sleep mode or dimming the display screen or otherwise changing the display in an unwanted manner. Specific types of scanning eye movement can be indicative of the user reading content on the display screen. If scanning eye movement is detected, the phone does not perform actions that could detract from the user's reading or otherwise using the display/touch screen. In another embodiment, the phone detects the eyes of a user and detects movement of the eyes. The phone scrolls a page on the display screen based on the movement of the eyes.

Figure 1:
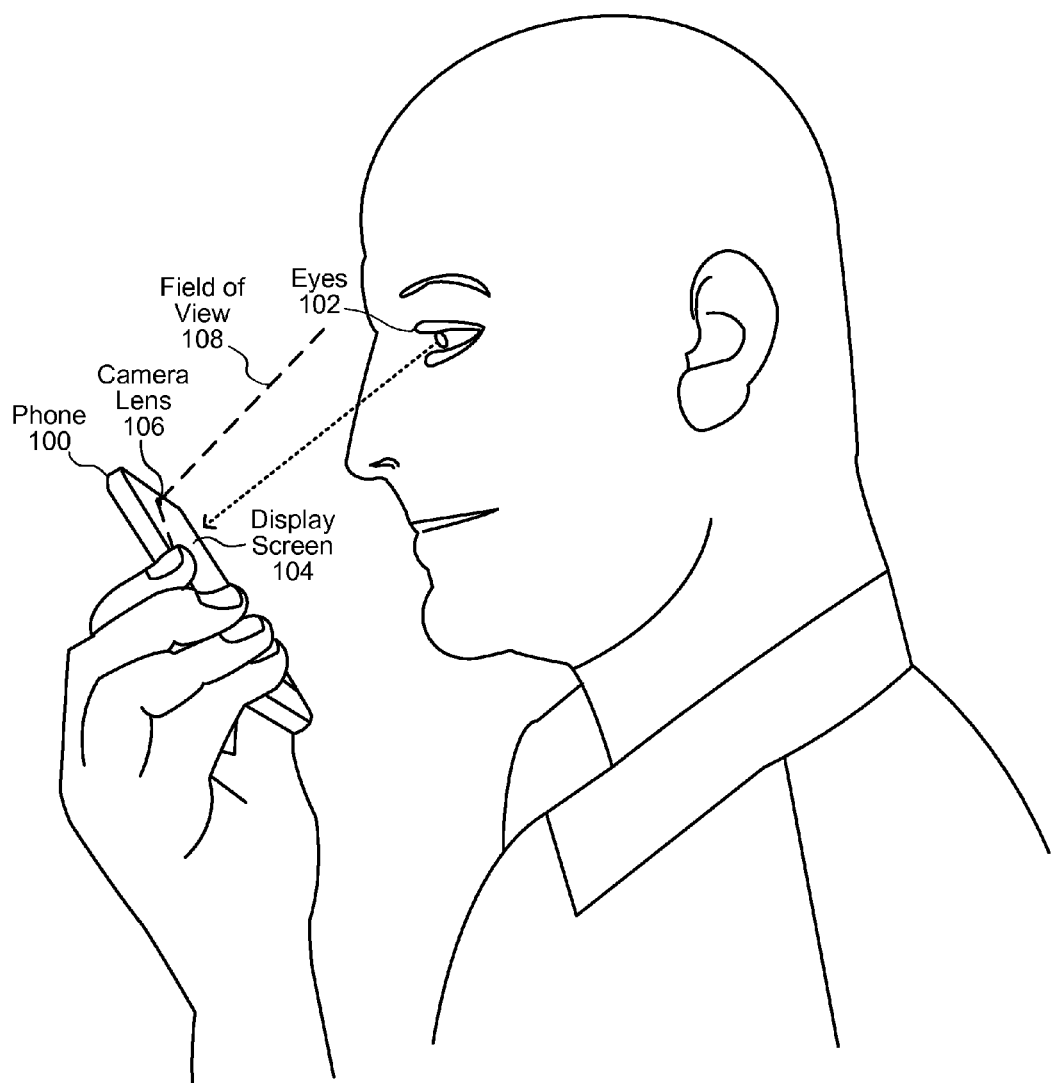
FIG. 1 illustrates a diagram of a phone that is held up to the eyes of a user reading a display screen of the phone, according to one embodiment.

FIG. 1 illustrates a diagram of a phone 100 that is held up to the eyes 102 of a user reading a display screen 104 of phone 100, according to one embodiment. In one embodiment, phone 100 includes a display (touch) screen 104 and a camera lens 106 of a camera. Camera lens 106 is configured to detect objects (e.g., eyes 102) that are within a predetermined distance from display screen 104. In one embodiment, camera lens 106 may be configured with a field of view 108 that can detect eyes 102 that may reasonably be considered to be looking at display screen 104.

In one embodiment, camera lens 106 may be a wide angle lens that can capture an object that is in a large area in front of display screen 104. In one embodiment, camera lens 106 may be a transparent cover over an existing camera lens, where camera lens 106 alters the optics to achieve a wider field of view and closer focus. As an overlay, camera lens 106 may be a film or button placed over an existing lens to alter the optics. In one embodiment, if camera lens 106 overlays an existing camera lens, phone 100 corrects any distortions to an image that may occur. Camera lens 106 may be permanently fixed to phone 100 or temporarily fixed to phone 100. In one embodiment, camera lens 106 may be a permanent auxiliary lens on phone 100, which may be used by an existing camera or a separate dedicated camera with the purpose of detecting a user finger.

While camera lens 106 is shown in the upper center portion of phone 100, camera lens 100 may be located anywhere on the face of phone 100.

Figure 2:
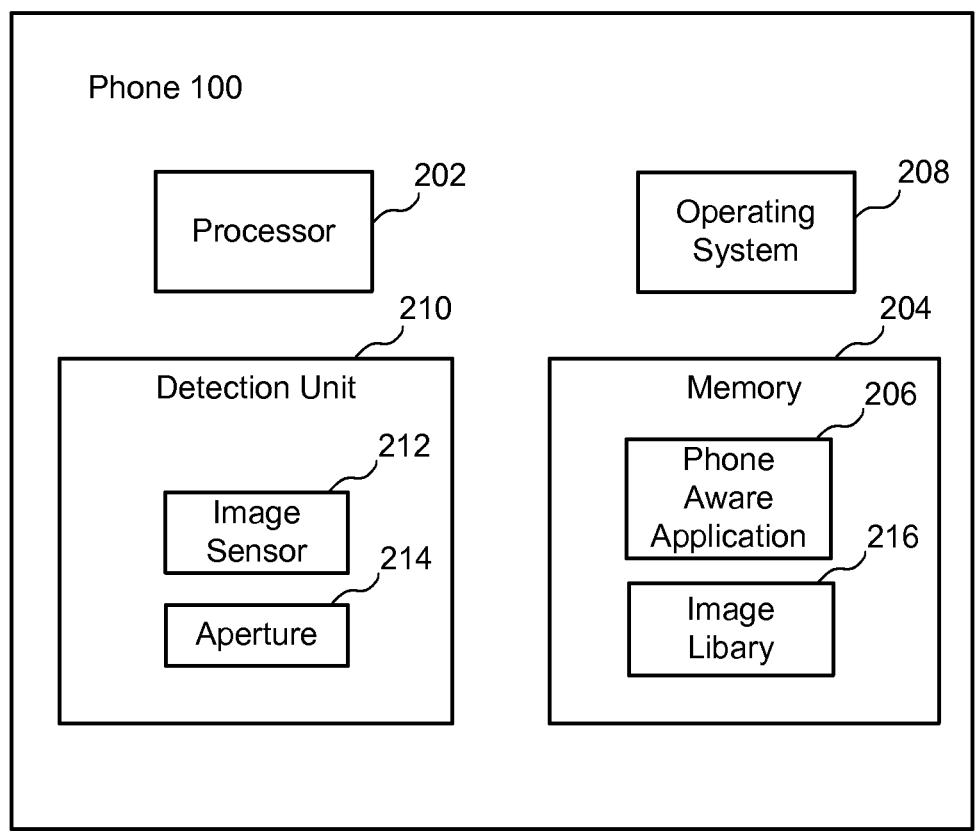
FIG. 2 illustrates a block diagram of a phone, which may be used to implement the embodiments described herein.

FIG. 2 illustrates a block diagram of a phone 100, which may be used to implement the embodiments described herein. In one embodiment, phone 100 may include a processor 202 and a memory 204. A phone aware application 206 may be stored on memory 204 or on any other suitable storage location or non-transitory computer-readable medium. In one embodiment, memory 204 may be a non-volatile memory (e.g., random-access memory (RAM), flash memory, etc.). Phone aware application 206 provides instructions that enable processor 202 to perform the functions described herein. In one embodiment, processor 202 may include logic circuitry (not shown).

In one embodiment, phone 100 also includes a detection unit 210. In one embodiment, detection unit 210 may be a camera that includes an image sensor 212 and an aperture 214. Image sensor 212 captures images when image sensor 212 is exposed to light passing through camera lens 106 (FIG. 1). Aperture 214 regulates light passing through camera lens 106. In one embodiment, after detection unit 210 captures images, detection unit 210 may store the images in an image library 216 in memory 204.

In other embodiments, phone 100 may not have all of the components listed and/or may have other components instead of, or in addition to, those listed above.

The components of phone 100 shown in FIG. 2 may be implemented by one or more processors or any combination of hardware devices, as well as any combination of hardware, software, firmware, etc.

While phone 100 is described as performing the steps as described in the embodiments herein, any suitable component or combination of components of phone 100 may perform the steps described.

Figure 3:
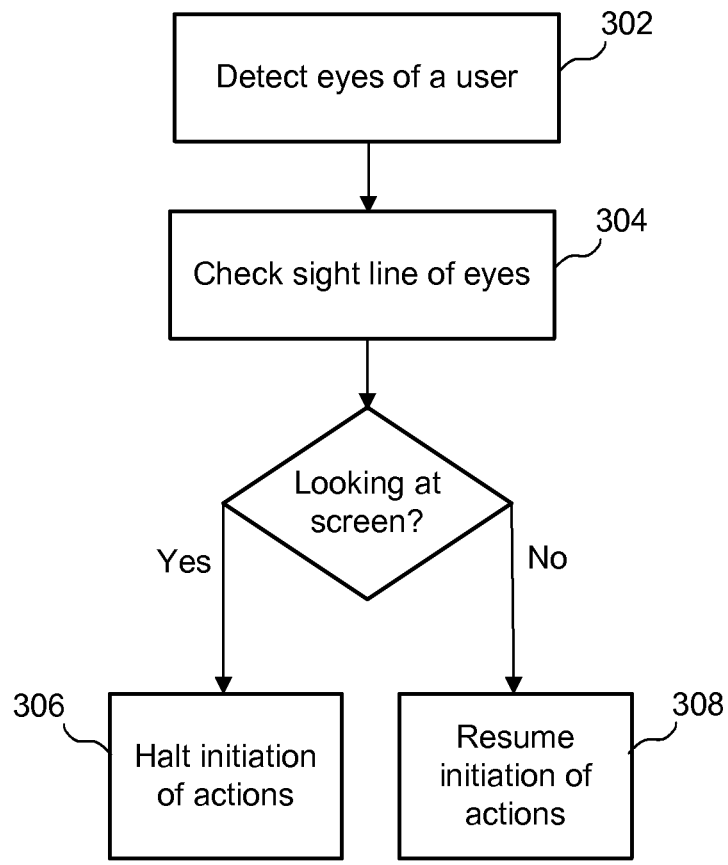
FIG. 3 illustrates an example simplified flow diagram for enhancing phone functionality based on detection of eyes of a user, according to one embodiment.

FIG. 3 illustrates an example simplified flow diagram for enhancing phone functionality based on detection of eyes of a user, according to one embodiment. Referring to both FIGS. 1 and 3, a method is initiated in block 302, where phone 100 detects eyes 102 of a user. In block 304, phone 100 checks for the sight line of eyes 102 relative to display screen 104 prior to phone 100 initiating one or more predetermined actions. In one embodiment, the predetermined actions may include activating a sleep mode on the phone, dimming display screen 104, turning off the phone, closing a web page, application, window; etc. In block 306, phone 100 halts an initiation of the one or more predetermined actions if the sight line shows that the user is looking at the screen.

Eye scanning movement can be indicative of the user reading content on display screen 104. By halting such actions when scanning movement of eyes 102 is detected, phone 100 enables the user to read pages on display screen 104 without interruption from changing display screen 104 such as by dimming or going blank. In block 308, phone 100 resumes initiation of the one or more predetermined actions if movement of eyes 102 is not detected.

A sight line to determine if a user is looking at the screen (or is likely to be looking at the screen) can be determined from just one image or picture, although more than one picture may be used to improve accuracy. In order to determine eye scanning movement it is necessary to take more than one picture. A still camera taking one or more pictures, or a video camera can be used in many cases to make the determinations. In one embodiment, to detect movement of eyes 102, phone 100 takes a first picture prior to phone 100 initiating the one or more predetermined actions. Phone 100 then determines if eyes are in the first picture. The mere presence of eyes in a picture can be used as a probable guess that the user's eyes are looking at the display screen. Alternatively, additional calculations can be used so that if eyes are in the first picture, phone 100 estimates a first direction, or sight line, of the eyes in the first picture. The sight line can be used to more accurately determine where the eyes are looking.

In order to determine eye movement such as scanning movement to determine if a user is reading something on the display screen, phone 100 can take a second picture. Phone 100 estimates a second sight line of the eyes in the second picture. Phone 100 can then determine that the eyes are moving if the first direction is different from the second direction. Further analysis of the eye movement can determine that the user is likely reading something on the screen and can approximate where on the screen the user is looking and in what direction the user is reading. In general, any suitable type of image recognition, e.g., facial or eye analysis, can be used. A design tradeoff between the number of pictures taken (or length of video taken) and the amount of processing to perform on the captured images can result in better eye recognition at the expense of using the phone's resources and causing processing delays.

In one embodiment, the predetermined actions are provided by a default list that is set at the factory. In one embodiment, phone 100 enables a user to select the one or more predetermined actions from a predetermined list of actions. In one embodiment, phone 100 enables a user to override the halting of one or more predetermined actions.

Figure 4:
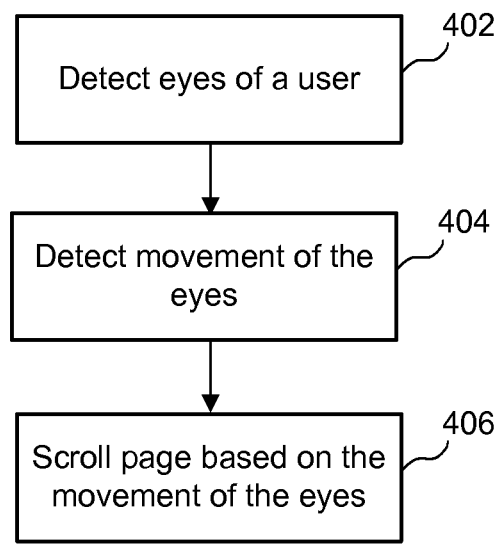
FIG. 4 illustrates an example simplified flow diagram for enhancing phone functionality based on detection of eyes of a user, according to one embodiment.

FIG. 4 illustrates an example simplified flow diagram for enhancing phone functionality based on detection of eyes of a user, according to one embodiment. Referring to both FIGS. 1 and 4, a method is initiated in block 402, where phone 100 detects eyes 102 of a user. In block 404, phone 100 detects movement of eyes 102 relative to display screen 104. In block 406, phone 100 scrolls a page on display screen 104 based on the movement and/or sight line position of eyes 102.

In one embodiment, phone 100 scrolls horizontally if the movement of eyes 102 is horizontal. In one embodiment, the amount of the scrolling is proportional to a degree of the movement. In one embodiment, phone 100 scrolls vertically if the movement of eyes 102 is vertical. In one embodiment, the amount of scrolling is proportional to a degree of the movement.

In one embodiment, to detect movement of eyes 102, phone 100 takes a first picture, and determines if eyes 102 are in the first picture. If eyes 102 are in the first picture, phone 100 estimates a first direction of the eyes in the first picture. Phone 100 then takes a second picture, and estimates a second direction of eyes 102 in the second picture. Phone 100 then characterizes the difference between the first direction and second direction. For example, if eyes 102 are in a lower position in the second picture relative to the position of eyes 102 in the first picture, phone 100 determines that the user's eyes 102 moved down a page. As such, phone 100 would scroll down the page based on the difference in positions between the first and second pictures.

Other ways of detecting eyes from images may be possible rather than trying to image the eyes directly. For example, if a user is wearing glasses then the reflection of light emitting from the display of a portable device such as a mobile phone may reflect off the glasses and can be used to determine that the user's eyes are likely to be in a particular sight line.

Although the description has been described with respect to particular embodiments thereof, these particular embodiments are merely illustrative, and not restrictive. In various embodiments, any detection device or sensor may be used to check for eyes. For example, in various embodiments, such a sensor can be an image sensor, a proximity sensor, a distance sensor, an accelerometer, an infrared sensor, an acoustic sensor, etc.

Although the description has been described with respect to particular embodiments thereof, these particular embodiments are merely illustrative, and not restrictive.

Any suitable programming language may be used to implement the routines of particular embodiments including C, C++, Java, assembly language, etc. Different programming techniques may be employed such as procedural or object-oriented. The routines may execute on a single processing device or on multiple processors. Although the steps, operations, or computations may be presented in a specific order, the order may be changed in particular embodiments. In some particular embodiments, multiple steps shown as sequential in this specification may be performed at the same time.

Particular embodiments may be implemented in a non-transitory computer-readable storage medium (also referred to as a non-transitory machine-readable storage medium) for use by or in connection with an instruction execution system, apparatus, system, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable non-transitory processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication or transfer of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a non-transitory machine-readable medium to permit a computer to perform any of the methods described above.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, they are intended to cover various modifications and similar arrangements as would be apparent to those skilled in the art. Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A method comprising:
   detecting eyes of a user by using a camera on a phone;
   checking for a position of the eyes relative to a display screen of the phone prior to the phone initiating one or more predetermined actions; and
   halting an initiation of the one or more actions if the position of the eyes is detected as looking at the phone, wherein the detecting of the position of the eyes comprises:
   taking a first picture prior to the phone initiating the one or more predetermined actions;
   determining if eyes are in the first picture;
   if eyes are in the first picture:
      estimating a first direction of the eyes in the first picture;
      taking a second picture; and
      estimating a second direction of the eyes in the second picture; and
      determining that the eyes are moving if the first direction is different from the second direction.

2. The method of claim 1, wherein the one or more predetermined actions includes reducing a brightness of the display screen.

3. The method of claim 1, further comprising enabling a user to select the one or more predetermined actions from a predetermined list of actions.

4. The method of claim 1, further comprising enabling a user to override the halting of one or more predetermined actions.

5. The method of claim 1, further comprising resuming the initiation of the one or more predetermined actions if no eyes are detected looking in the direction of the device.

6. A non-transitory computer-readable storage medium carrying one or more sequences of instructions thereon, the instructions when executed by a processor cause the processor to: detect eyes of a user; take a first picture prior to the phone initiating the one or more predetermined actions; determine if eyes are in the first picture; if eyes are in the first picture: estimate a first direction of the eyes in the first picture; take a second picture; and estimate a second direction of the eyes in the second picture; and determine that the eyes are moving if the first direction is different from the second direction; check for movement of the eyes relative to a display screen of a phone prior to the phone initiating one or more predetermined actions; and halt an initiation of the one or more predetermined actions if movement of the eyes is detected.

7. The non-transitory computer-readable storage medium of claim 6, wherein the one or more predetermined actions comprise one or more of activating a sleep mode on the phone, and dimming the display screen.

8. The non-transitory computer-readable storage medium of claim 6, wherein the instructions further cause the processor to enable a user to select the one or more predetermined actions from a predetermined list of actions.

9. The non-transitory computer-readable storage medium of claim 6, wherein the instructions further cause the processor to enable a user to override the halting of one or more predetermined actions.

10. The non-transitory computer-readable storage medium of claim 6, wherein the instructions further cause the processor to resume the initiation of the one or more predetermined actions if the no movement of the eyes is detected.

11. An apparatus comprising:
   one or more processors; and
   logic encoded in one or more tangible media for execution by the one or more processors, and when executed operable to:
   detect eyes of a user;
   take a first picture prior to the phone initiating the one or more predetermined actions;
   determine if eyes are in the first picture;
   if eyes are in the first picture:
      estimate a first direction of the eyes in the first picture;
      take a second picture; and
      estimate a second direction of the eyes in the second picture; and
      determine that the eyes are moving if the first direction is different from the second direction;
   check for a position of the eyes relative to a display screen of a phone prior to the phone initiating one or more predetermined actions; and
   halt an initiation of the one or more predetermined actions if the position of the eyes is detected.

12. The apparatus of claim 11, further comprising a sensor that checks for the eyes.

13. The apparatus of claim 11, further comprising a sensor that checks for the eyes, wherein the sensor is one or more of an image sensor and an accelerometer.

14. The apparatus of claim 11, further comprising a camera that has a lens configured to detect objects within the predetermined distance from the display screen.

15. The apparatus of claim 11, wherein the one or more predetermined actions comprise one or more of activating a sleep mode on the phone, and dimming the display screen.

* * * * *